United States Patent [19]
Johnson et al.

[11] Patent Number: 5,828,869
[45] Date of Patent: Oct. 27, 1998

[54] MICROPROCESSOR ARRANGED FOR SYNCHRONOUSLY ACCESSING AN EXTERNAL MEMORY WITH A SCALABLE CLOCKING MECHANISM

[75] Inventors: William M. Johnson; David B. Witt, both of Austin, Tex.

[73] Assignee: Advanced Micro Devices, Inc., Sunnyvale, Calif.

[21] Appl. No.: 878,676

[22] Filed: Jun. 19, 1997

Related U.S. Application Data

[60] Continuation of Ser. No. 475,890, Jun. 7, 1995, abandoned, which is a division of Ser. No. 115,981, Sep. 1, 1993, which is a continuation of Ser. No. 663,314, Mar. 1, 1991, abandoned.

[51] Int. Cl.$^6$ ................... G06F 1/06; G06F 13/00
[52] U.S. Cl. .............. 395/556; 395/559; 395/872; 711/167
[58] Field of Search ................. 395/556, 559, 395/845, 872, 878, 880, 881; 711/167

[56] References Cited

U.S. PATENT DOCUMENTS

| | | |
|---|---|---|
| 4,016,545 | 4/1977 | Lipovski . |
| 4,056,845 | 11/1977 | Churchill, Jr. . |
| 4,095,267 | 6/1978 | Morimoto . |
| 4,217,637 | 8/1980 | Faulkner et al. . |
| 4,293,909 | 10/1981 | Catiller et al. . |
| 4,615,017 | 9/1986 | Finlay et al. . |
| 4,725,945 | 2/1988 | Kronstadt et al. . |
| 4,794,523 | 12/1988 | Adan et al. . |
| 4,847,758 | 7/1989 | Olson et al. . |
| 4,876,639 | 10/1989 | Mensch, Jr. . |
| 4,933,835 | 6/1990 | Sachs et al. . |

(List continued on next page.)

FOREIGN PATENT DOCUMENTS

WOX 3/1989 WIPO .

OTHER PUBLICATIONS

*Digital Design* by M. Morris Mano, Prentice–Hall, Inc. 1984, pp. 204–214.

*TTL Cookbook* by Dan Lancaster, Howar W. Sams & Co., Inc., 1980, pp. 191–193.

Electronic Design, vol. 31, No. 24, Nov. 24, 1983, WASECA, MN, Denville, NJ, USA, H.W.Look, et al. "Clock Chip Mutes Fast % Ps With Slower Devices", pp. 125–132.

IBM Technical Disclosure Bulletin, vol. 32, No. 9A, Feb. 1990, New York, US, "Dynamic Clock Frequency Changing For a Memory Controller", pp. 345–350.

*Primary Examiner*—Thomas M. Heckler
*Attorney, Agent, or Firm*—Foley & Lardner

[57] ABSTRACT

A microprocessor is provided which is capable of executing synchronous accesses to an external memory whether the external memory is operating at the same frequency as the operating frequency of the microprocessor or whether the external memory is operating at a frequency which is one-half the microprocessor operating frequency. The microprocessor includes a rate control input for receiving a rate control signal having a first level indicative of the microprocessor frequency being equal to the external memory frequency or a second level indicative of the microprocessor frequency being twice the external memory frequency. A memory access control is coupled to the rate control input and is responsive to the rate control signal, an internal microprocessor clock, and the external memory clock for causing the microprocessor to access the external memory in synchronism with the external memory clock when the external memory frequency is either equal to the microprocessor frequency or is one-half the microprocessor frequency.

77 Claims, 6 Drawing Sheets

U.S. PATENT DOCUMENTS

| | | |
|---|---|---|
| 4,956,804 | 9/1990 | Matsumoto . |
| 5,012,410 | 4/1991 | Ueda . |
| 5,036,230 | 7/1991 | Bazes . |
| 5,043,873 | 8/1991 | Muramatsu et al. . |
| 5,059,818 | 10/1991 | Witt et al. . |
| 5,119,485 | 6/1992 | Ledbetter, Jr. et al. . |
| 5,142,487 | 8/1992 | Graham, III . |
| 5,155,843 | 10/1992 | Stamm et al. . |
| 5,179,667 | 1/1993 | Iyer . |
| 5,191,657 | 3/1993 | Ludwig et al. . |
| 5,201,036 | 4/1993 | Yoshimatsu . |
| 5,263,172 | 11/1993 | Olnowich . |
| 5,274,788 | 12/1993 | Koike . |
| 5,305,452 | 4/1994 | Khan et al. . |
| 5,307,469 | 4/1994 | Mann . |
| 5,442,769 | 8/1995 | Corcoran et al. . |
| 5,481,690 | 1/1996 | Grumlose et al. ............... 395/494 |

MICROPROCESSOR ARRANGED FOR SYNCHRONOUSLY ACCESSING AN EXTERNAL MEMORY WITH A SCALABLE CLOCKING MECHANISM

This is a continuation application of Ser. No. 08/475,890 filed Jun. 7, 1995, abandoned, which is a divisional application of Ser. No. 08/115,981 filed Sep. 1, 1993 which is a continuation application of Ser. No. 07/663,314 filed Mar. 1, 1991, abandoned.

BACKGROUND OF THE INVENTION

The present invention generally relates to a microprocessor arranged to perform accesses to an external memory in synchronism with a memory clock which controls external memory timing and more particularly to a microprocessor arranged to perform such synchronized accesses when the microprocessor processing rate is equal to the external memory timing or is a predetermined multiple of the external memory timing.

Microprocessors are well known in the art which perform executions on operand data in accordance with operating instructions. In order for microprocessors to function in this manner, an external memory is usually associated with the microprocessor for storing the microprocessor operating instructions, operand data, and microprocessor resultants. The microprocessor accesses the external memory by performing load or store operations where, in a load operation, the microprocessor fetches an operating instruction or obtains data from the external memory and where, in a store operation, the microprocessor stores resultants in the external memory.

To permit the microprocessor to access the external memory, the microprocessor and external memory are usually coupled together by a plurality of control lines and one or more multiple-bit buses. One set of control lines carry access control signals from the microprocessor to the external memory and another set of control lines carry access control signals from the external memory to the microprocessor. Control signals from the microprocessor to the external memory may include access requests and read/write information to inform the external memory if an access is a load or a store operation.

One multiple-bit bus is generally utilized for conveying external memory addresses from the microprocessor to the external memory to permit the microprocessor to access a known external memory location for obtaining the required instruction or data during a load or for storing a resultant during a store. Another multiple-bit bus is utilized for conveying the requested data or instructions from the external memory to the microprocessor during a load operation and for conveying data, such as resultants, from the microprocessor to the external memory during a store operation.

Timing control between the microprocessor and external memory to support microprocessor external memory accesses is very important. Proper timing control assures efficient and accurate accessing for supporting desired microprocessor processing rates. Such timing control requires that the processor drive addresses, control signals, or data to the memory only during predetermined time periods when the memory is enabled to receive such microprocessor signals and similarly, requires that the external memory drive control signals and data to the processor only during predetermined time periods when the processor is enabled to receive such external memory signals. Such timing control is generally referred to as synchronous external memory accessing.

Synchronous external memory accessing has been achieved by providing a memory clock which provides memory clock pulses having a high phase and a low phase at a memory clock frequency. The memory clock pulses are provided to both the external memory and the microprocessor for establishing the accessing timing. The microprocessor generally includes its own internal clock which generates processor clock pulses having a high and a low phase at the processor operating frequency which, most generally, has been equal to the external memory clock frequency. A relationship between the phases of the memory clock pulses and the processor clock pulses is then established and maintained to determine the time periods in which the microprocessor drives control signals, addresses, or data to the external memory and the time periods in which the external memory drives control signals or data to the microprocessor. Adherence to these phase relationships results in synchronous accessing of the external memory by the microprocessor.

Synchronous accessing has been limited to those situations wherein the memory clock frequency is equal to the processor clock frequency. This is unfortunate because improved processing performance could be obtained if a given memory were able to support a microprocessor capable of processing at an operating frequency which is greater than the external memory clock frequency. For example, if a microprocessor having a 25 megahertz operating frequency and associated with a 25 megahertz external memory were replaced with a 50 megahertz microprocessor, even though the memory is a 25 megahertz memory, for most cases, the overall performance of the processing system would be doubled. Unfortunately, the prior art has not provided a microprocessor which is selectively operable for synchronously accessing an external memory which operates at the processor operating frequency or an external memory which operates at a fraction, such as one-half, of the microprocessor operating frequency. It would be most advantageous if such a microprocessor were capable of accessing either external memory in a manner which is transparent to the external memory, the external buses and the control lines to thereby provide such synchronous accessing regardless of the relative operating frequencies of the microprocessor and the memory.

SUMMARY OF THE INVENTION

The invention provides a microprocessor arranged to access an external memory for executing load and store operations in synchronism with a memory clock which provides memory clock pulses a first frequency for controlling the accessing rate of the memory. The microprocessor includes an internal clock for generating clock pulses at a second frequency for controlling the processing rate of the microprocessor and a rate control input for receiving a rate control signal having a first level indicative of the second frequency being equal to the first frequency or a second level indicative of the second frequency being a predetermined multiple of the first frequency. The microprocessor further includes memory access control means coupled to the rate control input and being responsive to the rate control signal and the memory clock pulses for causing the microprocessor to access the external memory in synchronism with the memory clock when the rate control signal is at the first level and the second frequency equals the first frequency and for causing the microprocessor to access the external memory in synchronism with the memory clock when the rate control signal is at the second level and the second frequency is the predetermined multiple of the first frequency.

The present invention further provides a microprocessor arranged to access an external memory coupled to the microprocessor by an external address bus for executing load and store operations in synchronism with a memory clock which provides memory clock pulses at a first frequency to the microprocessor and the external memory for controlling the accessing rate of the memory over the bus. The microprocessor includes an internal clock for generating clock pulses at a second frequency for controlling the processing rate of the microprocessor and a central processing unit for providing external memory addresses when the microprocessor is to access the external memory. The microprocessor further includes a bus interface unit for controlling when the external memory addresses are to be conveyed to the external memory over the bus to enable the synchronous accessing of the external memory and includes a rate control input for receiving a rate control signal having a first level indicative of the second frequency being equal to the first frequency or a second level indicative of the second frequency being a predetermined multiple of the first frequency. The bus interface unit also includes a control circuit responsive to the rate control signal levels, the memory clock, and the internal clock for causing the external memory address to be placed on the bus when the memory clock and the internal clock are in a first predetermined phase relation to each other for obtaining the synchronous accessing of the external memory by the microprocessor.

The present invention further provides an output buffer for use in a microprocessor for driving outputs to an external memory over an external bus. The output buffer includes an input for receiving an input signal level, an output for driving the external bus with the level of the input signal, and a control input for receiving a control signal. The control input is coupled to the output for causing the output to drive the external bus with the level of the input signal responsive to the control signal. The output buffer further includes an isolating circuit coupled between the input and the output and being coupled to the control input for isolating the input from the output in response to the control signal to enable the input to be updated with a new input signal level while the external bus is being driven with the input signal level.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DETAILED DESCRIPTION OF THE PREFERRED EMBODIMENT

Figure 1:
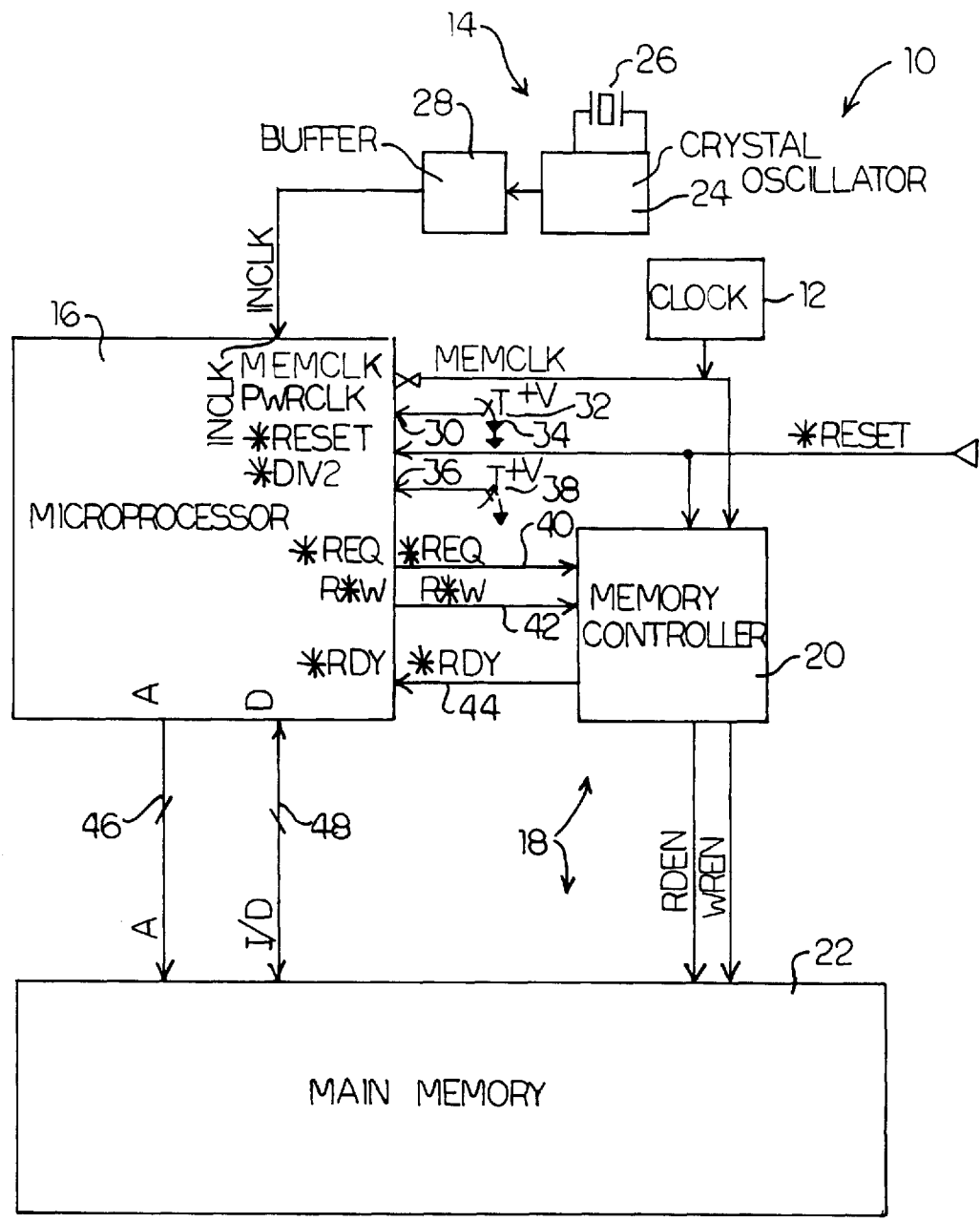
FIG. 1 is a block diagram of a processing system embodying the present invention.

Referring now to FIG. 1, it illustrates a processing system 10 embodying the present invention. The processing system 10 generally includes a memory clock 12, an external clock 14, a microprocessor 16, and an external memory 18.

The external memory 18 includes a memory controller 20 and a main memory 22. Such external memories are well known in the art.

The memory clock 12 is preferably arranged to provide memory clock pulses at frequency which determines the operating frequency of the external memory 18 and thus the external memory accessing rate. To that end, the clock 12 is coupled to the memory controller 20 and to the microprocessor 16 at an input identified as MEMCLK. As is well known in the art, the memory clock 12 provides memory clock pulses which include a high phase and a low phase.

The external clock 14 includes a crystal oscillator 24, a crystal 26 and a buffer 28. The external clock 14 is coupled to the microprocessor 16 at an input identified as INCLK. The external clock 14 provides clock pulses to the microprocessor 16 at a frequency which determines the operating or processing frequency of the microprocessor 16. The clock signals from the external clock 14 are utilized by the microprocessor 16 for internally generating a pair of processor clocks referred to herein as PH1 and PH2. The processor clocks PH1 and PH2 are preferably at the same frequency determined by the external clock 14 and are of reverse phase, with each processor clock PH1 and PH2 having a high phase and low phase. As a result, when PH1 is in its high phase, PH2 is in its low phase and correspondingly, when PH2 in its high phase, PH1 is in its low phase. In performing accesses to the external memory 18, the microprocessor, as will be seen hereinafter, drives outputs to the external memory 18 when there is a coincidence of the high phase of PH1 and the high phase of the memory clock and the external memory 18 drives outputs to the microprocessor 16 when there is a coincidence of the high phase of PH2 and the low phase of the memory clock. By adhering to these phase relationships between PH1, PH2 and the memory clock, the microprocessor 16 is capable of performing synchronous accesses to the external memory 18.

As illustrated in FIG. 1, the memory clock pulses are provided by the external clock 12. However, in accordance with the present invention, the memory clock pulses could also be generated by the microprocessor 16 wherein MEMCLK is utilized as an output for providing the memory clock pulses to the memory controller 20. In such a case, the memory clock 12 would not be needed. The microprocessor 16 is arranged for generating the memory clock pulses in response to the clock pulses received from the external clock 14.

The microprocessor 16 includes an input 30 for receiving a control signal (PWRCLK) which may be a logical 1 or a logical 0 level. The control signal at input 30 is provided by a switch 32 which is coupled to a positive voltage source when in the position illustrated and is coupled to ground when the switch 32 is in the other position indicated by the arrow 34. When the switch 32 is in the position as illustrated in the Figure, a logical 1 is impressed upon input 30 to cause the microprocessor 16 to generate the memory clock pulses and to provide the memory clock pulses at the output designated MEMCLK. When the switch 32 is in its alternate position so as to be coupled to ground, input 30 will be at a logical 0 level to cause MEMCLK to serve as an input for receiving the externally generated memory clock pulses from an external clock source such as external clock 12.

The microprocessor includes a further input 36 for receiving a rate control signal (*DIV2) which has a first level of logical 1 or a second level of logical 0. The level at input 36 is determined by another switch 38 which is either coupled to a positive voltage source for generating the logical 1 level or to ground for generating the logical 0 level. The level of the rate control signal at input 36 informs the microprocessor 16 whether the operating frequency of the external memory 18 is equal to the microprocessor operating frequency (when the rate control signal is a logical 1) or whether the operating frequency of the external memory 18 is one-half the operating frequency of the microprocessor 16 (when the rate control signal is a logical 0). Also, if input 30 is at a logical 1 to cause the microprocessor 16 to generate the memory clock pulses, then the microprocessor 16 will generate the memory clock pulses at its operating frequency if input 36 is a logical 1 and at one-half of the microprocessor's operating frequency if the rate control signal at input 36 is a logical 0. As a result, the microprocessor 16 may either receive externally generated memory clock pulses or generate the memory clock pulses. Furthermore, the microprocessor 16 is arranged to generate the memory clock pulses at either its operating frequency or one-half its operating frequency depending upon the input signal level at input 36. As will be seen hereinafter, the rate control input level at input 36 is also utilized by the microprocessor 16 to achieve synchronous accessing of the external memory 18 when the operating frequency of the external memory is equal to the microprocessor operating frequency and when the operating frequency of the external memory is one-half the microprocessor operating frequency.

The microprocessor 16 is coupled to the memory controller 20 by a plurality of access control lines 40, 42 and 44 which convey access control signals between the microprocessor 16 and the external memory 18. Control lines 40 and 42 convey first access control signals from the microprocessor 16 to the memory controller 20 which includes control signal *REQ over line 40 and R*W over line 42. *REQ is a control signal generated by the microprocessor 16 upon requesting a memory access. When this signal is active (low), the address for the access appears on the address bus 46 coupled between the microprocessor 16 and the main memory 22. R*W is a control signal which indicates whether the microprocessor access is a read (load) or a write (store) access. If the access is a read access, this signal will be high and if the access is a write access, this signal will be low.

Control line 44 conveys a second access control signal from the memory controller 20 to the microprocessor 16. The second access control signal is *RDY which indicates, for a read access, that valid data or instruction is currently on the instruction/data bus 48 which is coupled between the microprocessor 16 and the main memory 22. For a write access, this signal indicates that the access is complete and that data no longer need be driven by the microprocessor 16 on the instruction/data bus 48.

The address bus 46 is a unidirectional multiple-bit bus which conveys the address generated by the microprocessor 16 of the main memory storage location to be accessed. The instruction/data bus 48 is a bidirectional multiple-bit bus which conveys data from microprocessor 16 to the main memory 22 to be stored in the memory location corresponding to the address provided on address bus 46 and for conveying instructions and data from the main memory to the microprocessor 16 from the memory location of the main memory corresponding to the address conveyed on the address bus 46.

Figure 2:
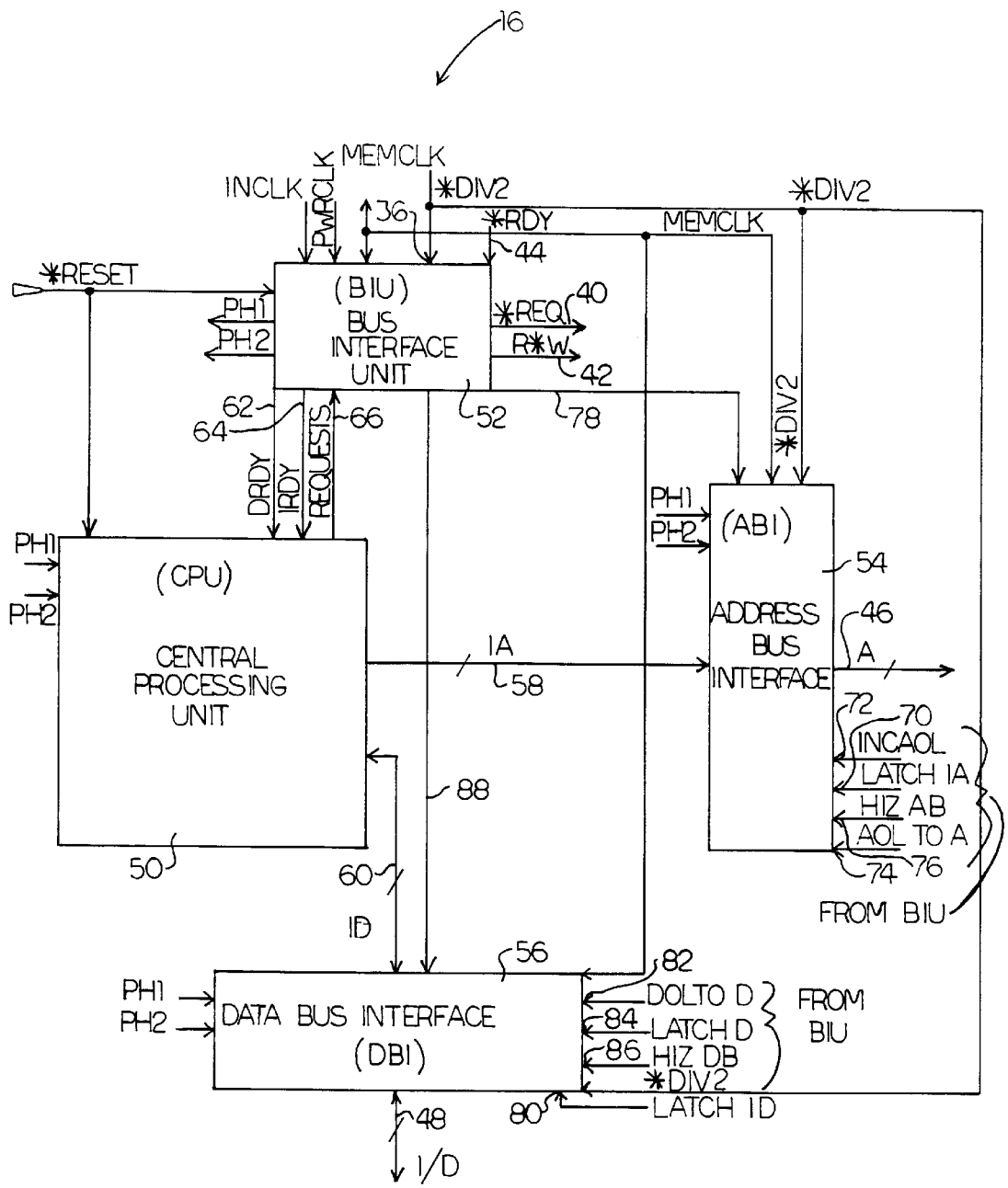
FIG. 2 is a block diagram of the microprocessor of the processing system of FIG. 1.

Referring now to FIG. 2, it illustrates the microprocessor 16 of FIG. 1 embodying the present invention in block diagram form. The microprocessor 16 generally includes a central processing unit 50, a bus interface unit 52, an address bus interface 54, and a data bus interface 56.

The central processing unit 50 generates the addresses for an external memory access and executes or processes that data of the current program that the microprocessor is running. The central processing unit 50 is coupled to the address bus interface 54 by a multiple-bit internal address bus 58 for conveying the external memory address for an access to the address bus interface 54. The central processing unit 50 is also coupled to the data bus interface 56 by an internal multiple-bit data bus 60 for conveying to the data bus interface 56 data to be stored in the external memory and for receiving from the data bus interface data or instructions received from the external memory during an external access. The central processing unit 50 is further coupled to the bus interface unit 52 by a plurality of internal control lines 62, 64, and 66. Internal control line 66 conveys access requests generated by the central processing unit to the bus interface unit. Internal control lines 62 and 64 convey data ready and instruction ready control signals respectively from the bus interface unit 52 to the central processing unit 50.

The bus interface unit 52 generates the control signals which assure the synchronous accessing of the external memory by the microprocessor 16. It drives the control lines 40 and 42 with the request and read/write control signals for conveying the same to the external memory. It also receives over the control line 44 the ready signals from the external memory upon the completion of a read or write access. In addition, the bus interface unit 52 generates the first and second processor clock pulses PH1 and PH2 for controlling the internal timing of the microprocessor. As previously mentioned, the first and second processor clock pulses PH1 and PH2 respectively are at the same frequency and are of opposite phase with each having a high phase and a low phase. As a result, when PH1 is in its high phase, PH2 is in its low phase, and when PH1 is in its low phase, PH2 is in its high phase.

The bus interface unit is also arranged for generating the memory clock pulses if the level of the PWRCLK control signal is a logical 1. The bus interface unit 52 is further arranged for receiving the central processing unit access request signals over line 66 and provides the data ready and instruction ready control signals to the central processing unit over the control lines 62 and 64.

As will be seen hereinafter, the bus interface unit includes a memory access control circuit which is coupled to the input 36 which receives the rate control input signal and is responsive to the rate control signal and the memory clock pulses for causing the microprocessor to access the external memory in synchronism with the memory clock when the rate control signal is a logical 1 and the microprocessor processing frequency is equal to the memory clock frequency and for causing the microprocessor to access the external memory in synchronism with the memory clock when the rate control signal is at a logical 0 and the microprocessor processing frequency is two times the memory clock frequency. The bus interface unit also provides control signals, to be described hereinafter, to the address bus interface 54 and data bus interface 56 for controlling when outputs, such as addresses and data are driven externally from the microprocessor.

The address bus interface 54 receives the external memory addresses from the central processing unit 50 over the internal address bus 58. The address bus interface includes an internal latch (not shown) which latches the address for an access responsive to a latch internal address control signal (LATCHIA) received at an input 70 from the bus interface unit. The address bus interface also includes another input 72 for receiving an increment address output latch control signal (INCAOL) received from the bus interface unit. The increment address output latch is utilized for sequential accesses to cause the output latch to increment to the next address without requiring the central processing unit 50 to generate an address for each of the sequential accesses. The address bus interface 54 further includes another input 74 for receiving from the bus interface unit an address output latch to address bus control signal (AOLTOA) which causes the address bus interface to drive the external address bus 46 with the address currently latched in its latch. Lastly, the address bus interface includes another input 76 for receiving from the bus interface unit a high impedance address bus control signal (HIZAB) which causes all of the outputs driving the external address bus 46 to assume a high impedance condition for isolating those outputs from the external address bus.

As will be noted in FIG. 2, the address bus interface further receives the rate control signal and the memory clock pulses. It also receives address bus interface control signals from the bus interface unit over an internal control line 78. The address bus interface 54 further receives the first and second processor clock pulses PH1 and PH2 as illustrated.

The data bus interface 56 performs a function similar to that of the address bus interface 54. It is coupled to the central processing unit by the internal data bus 60 for receiving data from the central processing unit during a store access and for conveying to the central processing unit data or instructions during a load access. The data bus interface also receives control signals from the bus interface unit including a latch internal data bus control signal (LATCHID) at an input 80. Like the address bus interface 54, the data bus interface 56 includes an internal latch (not shown) for latching data received from the central processing unit over the internal data bus 60. The data bus interface is further arranged to receive at an input 82 a data output latch to data bus control signal (DOLTOD) from the bus interface unit to cause the data bus interface to transfer the data in its internal latch to the external instruction/data bus 48. At another input 84 the data bus interface 56 receives from the bus interface unit a latch data bus control signal (LATCHD) which causes the bus interface unit to latch data received over the external instruction/data bus 48. The data bus interface also receives at an input 86 a high impedance data bus control signal (HIZDB) from the bus interface unit to cause the outputs of the data bus interface which drive the external bus 48 to assume a high impedance condition for isolating those outputs from the external instruction/data bus 48. The data bus interface 56 also receives over an internal control line 88 data bus control signals from the bus interface unit 52. Also as illustrated, the data bus interface 56 receives the memory clock pulses, the rate control signal, and the first and second processor clock signals PH1 and PH2.

As previously mentioned, the memory clock pulses include a first phase portion which is a high phase and a second phase portion which is a low phase. In accordance with this preferred embodiment of the present invention, the external memory is arranged to receive inputs from the microprocessor during the high phase portion of the memory clock pulses and to drive outputs to the microprocessor during the low phase portion of the memory clock pulses. To provide synchronous accessing, in accordance with this preferred embodiment, the microprocessor is enabled to drive outputs to the external memory when there is a coincidence of the high phase of the first processor clock pulses PH1 and the high phase portion of the memory clock pulses and is enabled to receive inputs from the external memory when there is a coincidence of the high phase portion of the second processor clock pulses PH2 and the low phase portion of the memory clock pulses. Preferably, the rising edges of the memory clock pulses and the first processor clock pulses are essentially coincident or the rising edges of the first processor clock pulses are slightly delayed with respect to the rising edges of the memory clock pulses.

When the processor clock pulses and the memory clock pulses are at the same frequency, every rising edge of the memory clock pulses presents a valid edge or time for the microprocessor to drive outputs during its next high phase of the first processor clock pulses and every rising edge of the second processor clock pulses defines the proper edge or time for enabling the receipt of inputs from the external memory. However, if the rate control signal is a logical 0 indicating that the memory clock pulses are at one-half the frequency of the processing clock pulses, the foregoing relationship is not always valid. As will be appreciated by those skilled in the art, under these conditions there will be times when the high phase of the first processor clock pulses PH1 will not coincide with the high phase of the memory clock pulses but instead, will coincide with the low phase portion of the memory clock pulses and the same would hold true for the second processor clock pulses. As a result, when the microprocessor is to access a memory which is operating at one-half the frequency of the processing frequency, it is necessary to determine the proper times for the microprocessor to drive outputs to the external memory and to enable the microprocessor to receive inputs from the external memory during the proper time periods.

For an access to the external memory, when the memory clock pulses are at the same frequency as the processor clock pulses, the central processing unit, during the high phase of the first processor clock pulses PH1, provides the request signal on line 66 and provides the external memory address for the access on the internal address bus 58. During the immediately following high phase of the second processor clock pulses PH2, the bus interface unit detects the request from line 66 and asserts the control signal LATCHIA at input 70 of the address bus interface 54 to cause the address bus interface to latch the external memory address. If the external address bus is available and if there is no pending access, upon the immediately following high phase of PH1 the bus interface unit asserts the control signal AOLTOA at input 74 of the address bus interface 54 to cause the address bus interface to drive the external address bus 46 with the external memory address for the access. Also during this time period, the bus interface unit provides the request signal on control line 40 (active low) and indicates on line 42 whether the access is a read (load) or a write (store) access. If it is a read access, line 42 will be at a logical 1, and if it is a write access, line 42 will be at a logical 0.

If the access is a read access, during the next immediately following high phase of PH2 and all subsequent high phases of PH2 the central processing unit 50 will check the state of the data ready control signal on control line 62. If the load takes a large number of microprocessor cycles to complete, the central processing unit will stop processing at this state until it receives the data ready control signal over line 62. When the bus interface unit receives the ready signal over control line 44 during a high phase of PH2, it asserts the data ready control signal over line 62 which is then sensed by the central processing unit 50. Upon seeing the data ready signal asserted on line 62, the central processing unit then knows the access has been completed and that the requested data is latched on the instruction/data bus 48 for receiving the data and continuing its processing.

Figure 3:
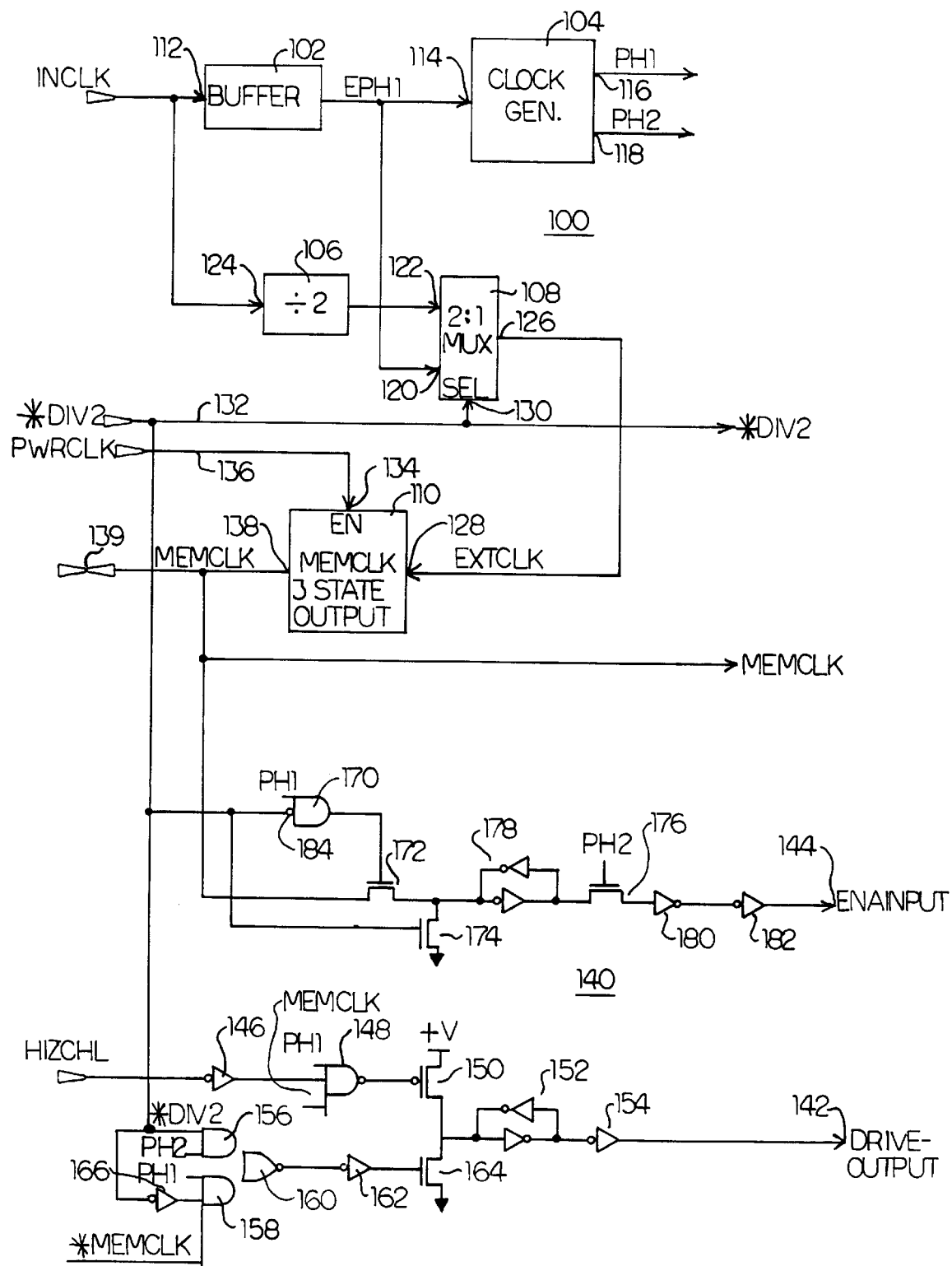
FIG. 3 is a schematic circuit diagram in partial block diagram form illustrating a portion of the bus interface unit of the microprocessor illustrated in FIG. 2.

Referring now to FIG. 3, it illustrates an internal clock generator 100 of the bus interface unit and an enable circuit 140 of the bus interface unit. The internal clock generator 100 generally includes a buffer 102, a clock generator 104, a divide-by-two frequency divider 106, a multiplexer 108, and a tristate buffer 110.

The buffer 102 includes an input 112 for receiving input clock signals from the external clock source 14 (FIG. 1). The buffer 102 is coupled to an input 114 of clock generator 104. Clock generator 104 includes a first output 116 for providing the first processor clock pulses PH1 and a second output 118 for providing the second processor clock pulses PH2. As previously mentioned, the clock pulses PH1 and PH2 define the processing frequency of the microprocessor, have high and low phases, and are of opposite phase relation.

Multiplexer 108 includes a first input 120 which is coupled to the output of buffer 102. Multiplexer 108 includes a second input 122 which is coupled to the output of the divide-by-two frequency divider 106 which in turn has an input 124 coupled to the incoming clock pulses provided by the external clock source 14 (FIG. 1). The output 126 of multiplexer 108 is coupled to the input 128 of the tristate buffer 110. The multiplexer 108 also includes a select input 130 which is coupled to the rate control signal control line 132. The tristate buffer 110 includes an enable input 134 which is coupled to the control line 136 which carries the control signal PWRCLK. Lastly, the tristate buffer includes an output 138 which is coupled to the port 139 (MEMCLK) which serves as an input when the microprocessor receives the memory clock pulses from an external source and which serves as an output when the microprocessor provides the memory clock pulses.

When the microprocessor is provided with the memory clock pulses from an external source, the control signal PWRCLK will be at a logical 0 which is impressed over line 136 to the enable input 134 of the tristate buffer 110. This causes the tristate buffer to tristate at output 138 and to impose a high impedance between the port 139 and the input 128 of the tristate buffer. This permits the port 139 to be utilized as an input for receiving the externally generated memory clock pulses.

When the microprocessor is to provide the memory clock pulses, the control signal PWRCLK is at a logical 1 and is impressed upon the enable input 134 of the tristate buffer. This causes the tristate buffer to transfer the clock pulses received at its input 128 to its output 138 and thus to the port 139 which now serves as an output and to all other memory clock pulse inputs of the microprocessor and to the external memory. If the microprocessor is to provide the memory clock pulses at the same frequency as the processor clock pulses PH1 and PH2, the rate control signal on line 132 will be a logical 1 which is impressed on the select input 130 of the multiplexer 108. This causes the multiplexer to couple input 120 to its output 126 to provide the memory clock pulses at the same frequency as the processor clock pulses.

If the microprocessor is to provide the memory clock pulses at a frequency which is one-half of the microprocessor processing frequency, the rate control signal on line 132 would be a logical 0 which is impressed upon the select input 130 of multiplexer 108. This causes multiplexer 108 to couple its input 122 to its output 126 to thereby convey to the tristate buffer 110 the input clock signals provided by the external source 14 (FIG. 1) which are now divided by two to provide memory clock pulses at one-half the frequency of the processor clock pulses.

The enable circuit 140 provides a first control signal (DRIVE OUTPUT) at an output 142 to control when the microprocessor may drive outputs to the external memory and a second control signal (ENAINPUT) at an output 144 to enable the microprocessor for receiving inputs from the external memory. As will be seen hereinafter, these signals are generated regardless of whether the microprocessor is accessing a memory operating at the microprocessor processing rate or at one-half the microprocessor processing rate. Hereinafter, when the microprocessor is accessing a memory operating at the microprocessor processing rate, this condition will be referred to as the 1X mode, and when the microprocessor is accessing a memory operating at one-half the microprocessor processing rate, this condition will be referred to as the 0.5X mode.

For generating the first control signal at output 142, the enable means 140 includes an inverter 146, an AND gate 148, a p-channel field effect transistor 150, a latch 152, an inverter 154, an AND gate 156, an AND gate 158, a NOR gate 160, an inverter 162, and a p-channel field effect transistor 164.

NAND gate 148 includes an input which is coupled to the first processor clock pulses PH1, a second input coupled to the output of inverter 146, and a third input coupled to the memory clock pulses. The input of inverter 146 is coupled to a control signal HIZCHL which determines whether the outputs of the microprocessor are to be at a high impedance. If they are not to be at a high impedance, the control signal at the input of inverter 146 will be at a logical 0 level to cause the second input of NAND gate 148 to be at a high level.

In the 1X mode of operation of the microprocessor, upon the coincidence of the high phase of PH1 and the high phase portion of the memory clock pulses, NAND gate 148 will provide a low level to the gate of p-channel field effect transistor 150 to cause transistor 152 to conduct. This impresses a high level onto the latch 152 for maintaining the first control signal at output 142 at a high level to enable the microprocessor to drive outputs to the external memory. AND gate 156 includes a first input which is coupled to the rate control signal which, in the 1X mode, will be a logical 1, and another input which is coupled to the second processor clock pulses PH2. AND gate 158 has an input which is coupled to the first processor clock pulses PH1, a second input which is coupled to the rate control signal through an inverter 166 and a third input which is coupled to the inverse of the memory clock pulses. The outputs of AND gates 156 and 158 are coupled to the inputs of NOR gate 160. The output of NOR gate 160 is coupled to the input of inverter 162 which has an output coupled to the gate of n-channel field effect transistor 164.

When PH1 goes low, PH2 will go high. Also, the inverse of the memory clock pulses will also go high to cause AND gate 156 to provide a high level to NOR gate 160 and AND gate 158 to provide a low level to NOR gate 160. This causes NOR gate 160 to provide a low level to the input of inverter 162 which in turn provides a high level to the gate of transistor 164. This turns transistor 164 on to cause the latch 152 to go from a high input level to a low input level to in turn cause the first control signal at output 142 to go low. As a result, in the 1X mode, the first control signal (DRIVE OUTPUT) is high during the coincidence of the high phase of PH1 and the high phase portion of the memory clock pulses and is at a low level during the low phase of PH1 and the low phase portion of the memory clock pulses. As will be seen hereinafter, this enables the microprocessor to drive outputs to the external memory when the first processor clock pulses and the memory clock pulses are both at a high level and disables the microprocessor from driving outputs to the external memory.

In the 0.5X mode the first control signal at output 142 will go high under the same conditions as described above, namely, during the coincidence of the high phase of the first processor clock pulses and the high phase portion of the memory clock pulses. However, it will be noted that the first control signal is not to be asserted until the beginning of the low phase portion of the memory clock pulses. This permits the microprocessor to drive outputs in the 0.5X mode for an extended period of time during the entire high phase portion of the memory clock pulses while still remaining in synchronism with the external memory clock.

For generating the second control signal at output 144, the enable circuit 140 includes an AND gate 170, n-channel field effect transistors 172, 174, and 176, a latch 178, and a pair of inverters 180 and 182. In the 1X mode, the logical 1 rate control signal is impressed upon the gate of n-channel field effect transistor 174. This turns transistor 174 on to impress a low level onto the input of latch 178. This causes the output of latch 178 to be at a high level continuously which is transferred to the output 144 during each high phase of the second processor clock signal PH2. As a result, in the 1X mode the microprocessor is enabled for receiving inputs from the external memory during each high phase of PH2.

In the 0.5X mode, the low level of the rate control signal enables the latch 178 to sample the level of the memory clock during the high phase of PH1. If the memory clock is high (just saw a rising edge) then the following high phase of PH2 will cause the second control signal at output 144 to be a logical 0 indicating that this is a time to ignore input signals such as ready signals from the external memory and to not attempt an external access. If the memory clock is sampled low during the high phase of PH1, then, since the microprocessor is operating in the 0.5X mode, the next high phase of PH1 will correspond approximately to the rising edge of the memory clock. This is a valid time to sample inputs and to enable output drivers or make transitions on state machines in a manner to be described hereinafter.

As a result, it can be seen that the enable circuit 140 provides enables for driving outputs and enables for receiving inputs during proper times whether the microprocessor is in the 1X or the 0.5X mode. When in the 0.5X mode, inputs are enabled for receiving inputs from the external memory during every other high phase of PH2 and outputs are enabled for driving outputs to the external memory during every other high phase of PH1 and until a falling edge of the memory clock pulses.

Figure 4:
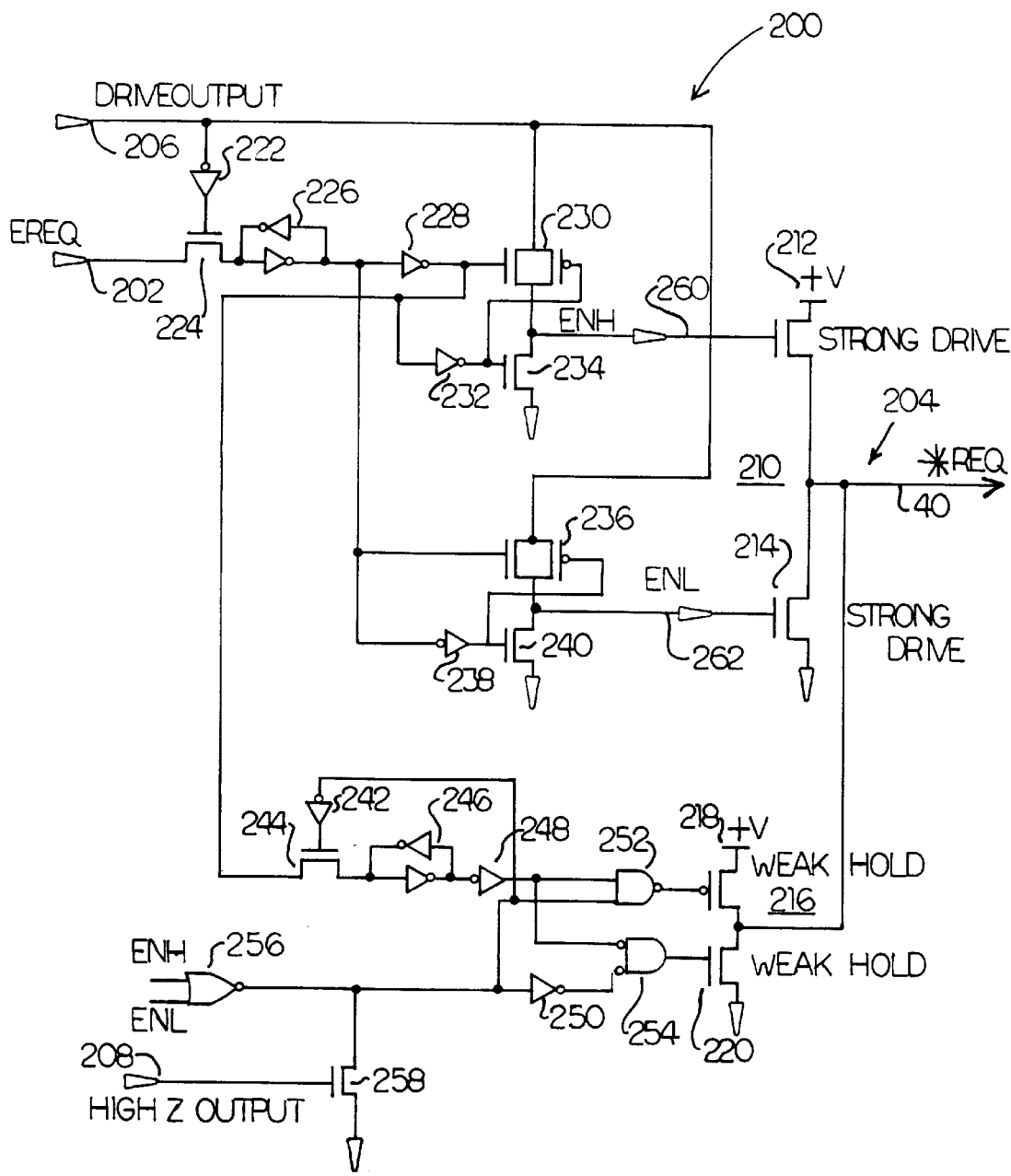
FIG. 4 is a schematic circuit diagram of an output buffer embodying the present invention and which may be utilized to advantage for driving the busses and control lines from the microprocessor illustrated in FIG. 2.

Referring now FIG. 4, it illustrates in schematic circuit diagram form an output buffer 200 which may be utilized to advantage in practicing the present invention in accordance with this preferred embodiment at each of the outputs of the microprocessor 16 which drive the external busses and the control lines to the external memory. The output buffer 200 generally includes an input 202 for receiving input levels, an output 204 for driving the external control line 40 with the input level received at the input 202 at the proper time in a manner to be described hereinafter, a control input 206 for receiving the first control signal (DRIVE OUTPUT) to control when the input level at input level 202 is to be driven by the output 204 onto the external control line 40, and a high impedance output control input 208 for receiving a control signal (HIGH Z OUTPUT) when the output 204 is to impose a high impedance onto the external control line 40 for isolating the output 204 from the external control line 40.

The output 204 includes a strong or hard drive circuit 210 comprising a pair of n-channel field effect transistors 212 and 214 and a weak drive circuit 216 comprising a p-channel field effect transistor 218 and an n-channel field effect transistor 220. As will be seen hereinafter, when the input level is first driven out onto the external control line 40, it is driven by the strong drive circuit 210 during the assertion of the control signal at control input 206 and thereafter, after termination of the control signal at input 206, the input level is driven out onto the external control line 40 by the weak drive circuit 216 to hold the input level at the output. The weak drive circuit 216 allows the output buffer to tristate to the high impedance condition responsive to the high impedance output control input signal at input 208 more quickly than if the input signal level were being held by the strong drive circuit 210.

The output buffer 200 more particularly includes an inverter 222, an n-channel field effect transistor 224, a latch 226, another inverter 228, a transfer gate 230, a further inverter 232, and an n-channel field effect transistor 234. The output buffer further includes another transfer gate 236, another inverter 238, and an n-channel field effect transistor 240.

The output buffer still further includes another inverter 242, an n-channel field effect transistor 244, another latch 246, inverter 248, inverter 250, NAND gate 252, and NOR gate 254. Lastly, the output buffer 200 includes another NOR gate 256, and n-channel field effect transistor 258.

Inverter 222 is coupled between the control input 206 and the gate of transistor 224. Transistor 224 is coupled between the input 202 and the latch 226. The inverter 228 is coupled between the latch 226 and the transfer gate 230 which is coupled to the control input 206. The inverter 232 is coupled between the output of inverter 228 and the gate of transistor 234. Transistor 234 is coupled between the transfer gate 230 and ground potential. The source of transistor 234 is coupled to the gate of transistor 212.

The output of latch 226 is also coupled to the input of inverter 238 and the transfer gate 236 which is also coupled to the control input 206. The output of inverter 238 is coupled to the gate of transistor 240 and to the transfer gate 236. Transistor 240 is coupled between the transfer gate 236 and ground potential and has its source coupled to the gate of transistor 214. The drain of transistor 212 is coupled to the source of transistor 214 and their common junction is coupled to the external control line 40.

Transistor 244 is coupled between the output of inverter 228 and the input of latch 246. The output of latch 246 is coupled to the input of inverter 248 which has its output coupled to one input of NAND gate 252. The other input of NAND gate 252 is coupled to the output of NOR gate 256. Transistor 258 is coupled between the output of NOR gate 256 and ground potential and has its gate coupled to the high impedance output control input 208. The output of NOR gate 256 is also coupled to the input of inverter 250 which has its output coupled to one input of NOR gate 254. The other input of NOR gate 254 is coupled to the output of inverter 248. The second input of NAND gate 252 is also coupled to the output of inverter 248. The output of NAND gate 252 is coupled to the gate of transistor 218 and the output of NOR gate 254 is coupled to the gate of transistor 220. The drain of transistor 218 is coupled to the source of transistor 220 and their common junction is coupled to the external control line 40.

Although the output buffer 200 may be employed at anyone of the output ports of the microprocessor which drives the external busses or external control lines, for purposes of illustration, the operation of the output buffer 200 will be described with respect to the generation of the request control signal (*REQ) previously referred to which is generated by the microprocessor to request an external access of the external memory. As will be noted in FIG. 4, the input 202 is adapted to receive an early request (EREQ) control signal which is designated as being early since it appears at the input 202 prior to the time at which it is to be driven by the output onto the external control line 40 as the request signal. The appearance of the early request signal permits the input level of the early request signal to be set-up in advance before it is conveyed to the external memory as the request signal.

In operation, it will be noted that when the control signal at input 206 is not asserted (at a low level) the transistor 224 is turned on to permit the input level at input level 202 to be latched by latch 226. Also, when the control signal at input 206 is low, both transistors 212 and 214 will be off so as to not provide any output to the external control line 40.

When the control signal at input 206 asserts (goes high) transistor 224 will be turned off to permit the input level at input 202 to change without effecting the latch 226. As a result, the transistor 224 serves as an isolation means for isolating the input 202 from the latch 226 and thus the output of the output buffer 200 when the previous input signal level is driven out onto the external control line 40.

The assertion of the control signal at input 206 enables the strong drive circuit 210 to drive the previous input signal level to the external control line 40. The previous input signal will be latched by latch 226 so that if the previous input signal level is a high level, the strong drive transistor 212 will be turned on by the enable high control signal on line 260 and strong drive transistor 214 will be turned off by the enable low control signal on line 262 to cause the high input level to be driven out onto the external control line 40.

If the previous input signal is a low level, strong drive transistor 212 will be turned off by the enable high signal on line 260 and strong drive transistor 214 will be turned on by the enable low control signal on line 262. This causes the low input level of the previous input signal to be driven out onto the external control line 40. This later case, when the low level is driven out onto the external control line corresponds to the assertion of the request control signal (*REQ).

When the previous input signal level is driven out onto the external control line 40 by the strong drive circuit 210 in response to the assertion of the control signal at input 206, the previous input signal level is transferred to the weak drive circuit 216 by the level of the output of inverter 228 being transferred through transistor 244 to the latch 246. This transfer is enabled since the enable high and enable low control signals on lines 260 and 262 respectively are coupled to the inputs of NOR gate 256. Since one of those signals must be high and the other low, the output of NOR gate 256 will be low which is inverted by the inverter 242 to impress a high level on the gate of transistor 244. This maintains transistor 244 on for transferring the previous input level to the latch 246.

When the control signal (DRIVE OUTPUT) at input 206 deasserts (goes low) both the enable high and enable low control signals on lines 260 and 262 will go low to turn off the strong drive circuit 210 and to cause the output of NOR gate 256 to go high. This causes transistor 244 to turn off to isolate the latch 246 from the output of inverter 228. Because the time required for turning transistor 244 off is shorter than the time required for updating the latch 226 with the new input signal level, the previous input signal level will be preserved by the latch 246.

The weak drive circuit 216 now takes over to maintain the output 204 and thus the external control line 40 at the level originally established by the strong drive means. As well known in the art, the difference between the strong drive circuit 210 and the weak drive circuit 216 is mainly in the physical dimensions of the strong drive transistors as compared to the weak drive transistors. As well known, strong drive transistors are larger than weak drive transistors and are thus able to drive greater currents.

The weak drive means 216 is utilized to accommodate tristating of the output buffer 200 when the output is to assume a high impedance. Weak drivers may be tristated much more quickly than strong drivers. If after transfer of the previous input level to the weak drive means 216 the output buffer 200 is to be tristated, the high impedance output input control signal at 208 will assert as a high level to turn transistor 258 on. This pulls the input of inverter 250 to a low level which causes both transistors 218 and 220 to be turned off for isolating the output 204 from the external control line 40.

As can therefore be seen from the foregoing, the output buffer 200 initiates outputs to the external memory in response to the DRIVE OUTPUT control signal at control input 206. If the control signal at input 206 is a low level, the output of the output buffer 200 will be turned off regardless of the input level at the input 202. When the control signal at input 206 asserts, the output buffer 200 will drive the external control line with the previous input signal level maintained by latch 226 while the input 222 is isolated from the latch 226 to permit the input level at input 202 to assume a new level. When the control signal deasserts at input 206, the previous input signal level is transferred to the weak drive means 216 which then maintains the external control line 40 at the level corresponding to the previous input signal level. As a result, outputs to the external memory are initiated only upon the assertion of the DRIVE OUTPUT control signal and the output buffer 200 operates in the same manner regardless of whether the microprocessor is in the 1X mode or 0.5X mode for performing synchronous accesses to the external memory. As a result, the decision process as to when outputs are to be driven is made transparent to the output buffer 200.

Figure 5:
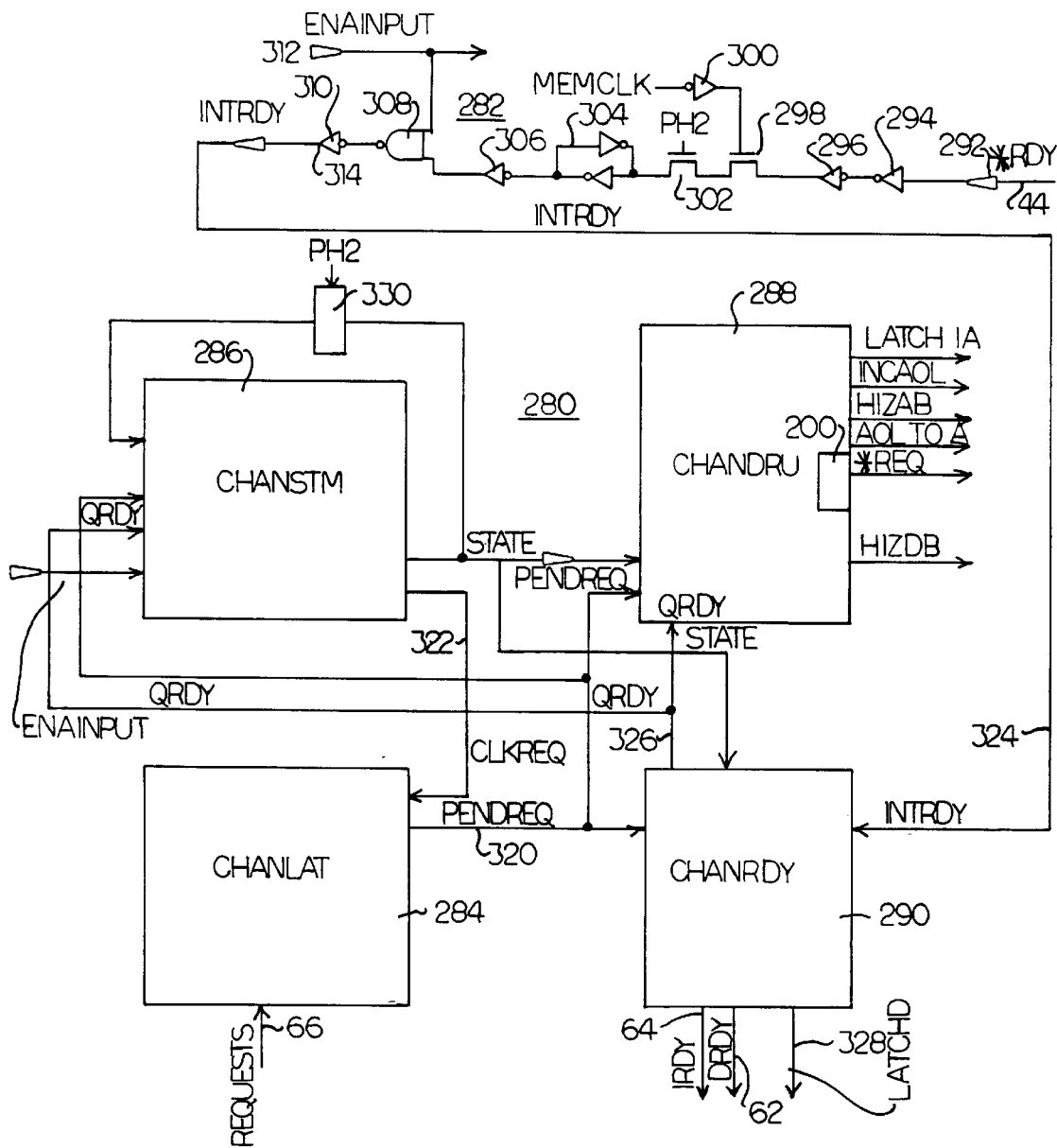
FIG. 5 is a block diagram of another portion of the bus interface unit of the microprocessor illustrated in FIG. 2.

Referring now to FIG. 5, it illustrates the controller portion 280 of the bus interface unit 52 of the microprocessor 16. The controller includes logic circuit 282, a channel latch 284, a channel state machine 286, a channel drive 288, and a channel ready 290. The logic means 282, as will be seen hereinafter, is responsive to the second control signal (ENAINPUT) to condition a microprocessor input for receiving an access control signal from the external memory and the channel latch 284, channel state machine 286, channel drive 288 and channel ready 290 operate together to control when a microprocessor access begins and when a microprocessor access is to be terminated. Furthermore, the channel latch 284, channel state machine 286, channel drive 288, and channel ready 290 operate in the same manner regardless of whether the microprocessor is in the 1X mode or the 0.5X mode for synchronously accessing the external memory.

A logic circuit such as logic circuit 282 may be employed in accordance with this preferred embodiment of the present invention at each input of the microprocessor which is to receive access control signals from the external memory. The logic circuit 282 includes an input 292 which is coupled to an external control line from the external memory and as illustrated, is coupled to the control line 44 for receiving the ready signal (*RDY) from the external memory. The logic circuit 282 further includes an inverter 294, an inverter 296, an n-channel field effect transistor 298, an inverter 300, an n-channel field effect transistor 302, and a latch 304. The logic circuit 282 further includes a noninverting buffer 306, a NAND gate 308, and an inverter 310. The logic circuit 282 further includes a control input 312 for receiving the second control signal (ENAINPUT) whose generation was explained with respect to FIG. 3.

As previously explained, when an external access is completed, the external memory provides a ready signal in the form of a low logic level over the external control line 44. The ready signal is buffered by inverters 294 and 296 and is conveyed to latch 304 upon the coincidence of the second phase portion (low phase) of the memory clock pulses which causes transistor 298 to conduct and the first phase (high phase) of the second processor clock pulses which causes transistor 302 to conduct. The ready signal is then latched in latch 304 and conveyed through the noninverting buffer 306 to one input of NAND gate 308. The ready signal is held at the input of NAND gate 308 by the latch 304. When the second control signal (ENAINPUT) at input 302 asserts, the ready signal is passed through the inverter 310 which provides an internal ready signal (INTRDY) at the output 314 of inverter 310. As a result, the ready signal from the external memory is not detected by the microprocessor until the second control signal (ENAINPUT) is asserted. In other words, if the ready signal is received from the external memory but the second control signal is at a low level, the rest of the bus interface unit controller will act as though the ready signal has not yet been received. Since the internal ready signal is conditioned by the enable input control signal at input 312 the rest of the bus interface unit is allowed to function in the same manner whether the microprocessor is in the 1X or 0.5X mode for synchronously accessing the external memory.

The channel latch 284 is used to detect access requests from the central processing unit 50 (FIG. 2) over the internal control line 66. Upon detecting a request signal on line 66, the channel latch generates a pending request control signal (PENDREQ) on internal control line 320 which is conveyed to the channel state machine 286, the channel drive 288, and the channel ready 290.

The channel drive 288 generates the following control signals which have been previously referred to with respect to FIG. 2: LATCHIA; INCAOL; HIZAB; AOLTOA; *REQ; and HIZDB. When the channel drive 288 asserts the control signals AOLTOA to cause the external memory address provided by the central processing unit to be transferred from the address output latch to the address bus and asserts the request signal (*REQ) the channel latch 284 will clear the pending request signal off of line 320 responsive to the clear request signal (CLRREQ) generated by the channel state machine 286. The channel latch 284 will latch the pending request control signal and remember the access request until seeing the clear request control signal over line 322.

The channel ready 290 is arranged for receiving the internal ready control signal from the logic circuit 282 over the internal control line 324. As will be explained subsequently, the channel state machine 286 defines two operating states, an idle state, and a single state. During the idle state, the microprocessor does not perform any processing relating to an external access. In the single state, the microprocessor performs processing relating to an external access until the external access has been completed. The channel ready 290 responsive to the internal ready control signal generates a qualified ready control signal (QRDY) on internal control line 326 if the channel state machine is in the single state. Also responsive to the internal ready control signal, and when the channel state machine 286 is in the single state, the channel drive 290 provides the instruction ready or data ready control signals over internal control lines 64 and 62 respectively and the latch data control signal over internal control line 328 to cause the data bus interface to latch the data received from the external memory.

As previously mentioned, the channel state machine 286 defines two different states, an idle state and a single state. The single state initiates and continues an external access to completion and the idle state terminates the completed access and maintains the microprocessor in an idle state until a new external access is initiated. The table below summarizes the state transitions of the channel state machine 286.

| CURRENT | PENDREQ | ENAINPUT | QRDY | NEXT-STATE | CLRREQ |
|---|---|---|---|---|---|
| IDLE   | 0 | x | x | IDLE   | 0 |
| IDLE   | 1 | 0 | x | IDLE   | 0 |
| IDLE   | 1 | 1 | x | SINGLE | 1 |
| SINGLE | 0 | x | 0 | SINGLE | 0 |
| SINGLE | 0 | x | 1 | IDLE   | 0 |
| SINGLE | 1 | x | 0 | SINGLE | 0 |
| SINGLE | 1 | x | 1 | SINGLE | 1 |

As can be seen by the table above, when the pending request signal is detected, the state machine looks at the current state. If the current state is IDLE, it then transitions to the single state if the second control signal (ENAINPUT) is present (indicating the correct edge of the memory clock). If the channel state machine is in the single state and detects a pending request, if there is a valid qualified ready indicating that a ready signal was received from the external memory for the current access, the state machine 286 remains in the single state and generates the clear request control signal to begin the next access of the external memory. Hence, it will be noted, that all transitions to the next state depend on the presence of the qualified ready control signal or the assertion of the second control signal (ENAINPUT) to transition to the next state. Otherwise, the next state remains the same as the current state. As a result, since the state transitions are responsive to the second control signal (ENAINPUT) or the qualified ready (QRDY) which are both based upon the proper memory clock edge, the state machine is independent of the memory clock whether the microprocessor is in the 1X or the 0.5X mode.

From the foregoing, it can thus be seen that the microprocessor is responsive to the internal ready signal which is used for generating the qualified ready signal when the state machine is in the single state for terminating the completed external access by transitioning to the idle state during the next cycle. It would also be noted that the channel state machine is coupled to a transfer device 330 so that when the channel state machine changes states, it does so upon the next first phase (high phase) of the second processor clock pulses PH2. Hence, when the channel state machine is in the idle state and sees a pending request and the second control signal (ENAINPUT), it will sequence to the single state upon the next high phase of PH2 for initiating an external access. Also, the state machine 286 is responsive to the qualified ready signal, the absence of a pending request signal, and being in the single state for sequencing to the idle state upon the next high phase of PH2 for terminating the completed external access. As previously mentioned, since the generation of the second control signal (ENAINPUT) and the qualified ready control signal (QRDY) are based on a proper rising edge of the memory clock, the state machine is independent of whether the microprocessor is in the 1x or the 0.5X mode and hence, independent of the decision-making process as to which rising edge of the memory clock outputs should be driven or inputs should be enabled.

Figure 6:
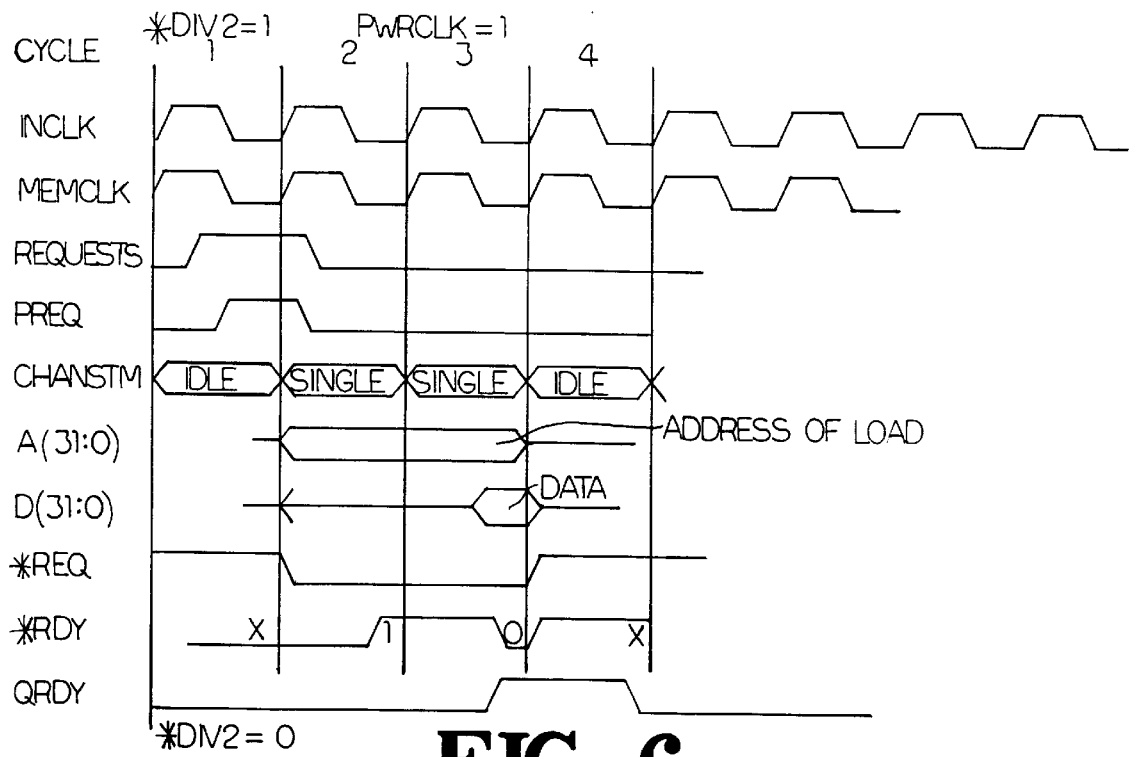
FIG. 6 is a series of waveforms illustrating the operation of the microprocessor of FIG. 2 in performing a synchronized external access to an external memory operating at the same frequency as the operating frequency of the microprocessor in accordance with the present invention.

Referring now to FIG. 6, it illustrates a series of waveforms depicting the operation of the microprocessor of the present invention when synchronously accessing an external memory when the external memory is operating at the same frequency as the processor operating frequency and when the microprocessor generates the memory clock pulses. As a result, the rate control signal (*DIV2) is equal to one and the PWRCLK control signal is also equal to one.

It will be noted that in this mode (the 1x mode) the frequency of the external clock (INCLK) and the frequency of the memory clock pulses are the same. Also, it will be remembered, that the first processor clock pulses (PH1) correspond essentially to the external clock pulses and that the second processor clock pulses (PH2) are at the same frequency as the first processor clock pulses and are of inverse phase relation.

During the first cycle of the memory clock, the microprocessor generates the request control signal. Responsive to the request control signal, the channel latch 284 generates the pending request control signal. At this point in time, the channel state machine is in the idle state. Since in this mode the enable input (ENAINPUT) control signal is generated whenever the memory clock is in its low phase, upon the beginning of the second memory clock cycle and with the assertion of the pending request and the channel state machine being in the idle state, the channel state machine will transition to the single state to cause the external memory address to be driven onto the external address bus and will cause the request signal (*REQ) to assert by going low. At the end of memory cycle number 3, the external memory has provided the data and has asserted the ready signal by forcing it low. Since the channel state machine had been in the single state and with the generation of the qualified ready signal, upon the beginning of the fourth memory cycle, the channel state machine transitions back to the idle state for completing the external access.

Figure 7:
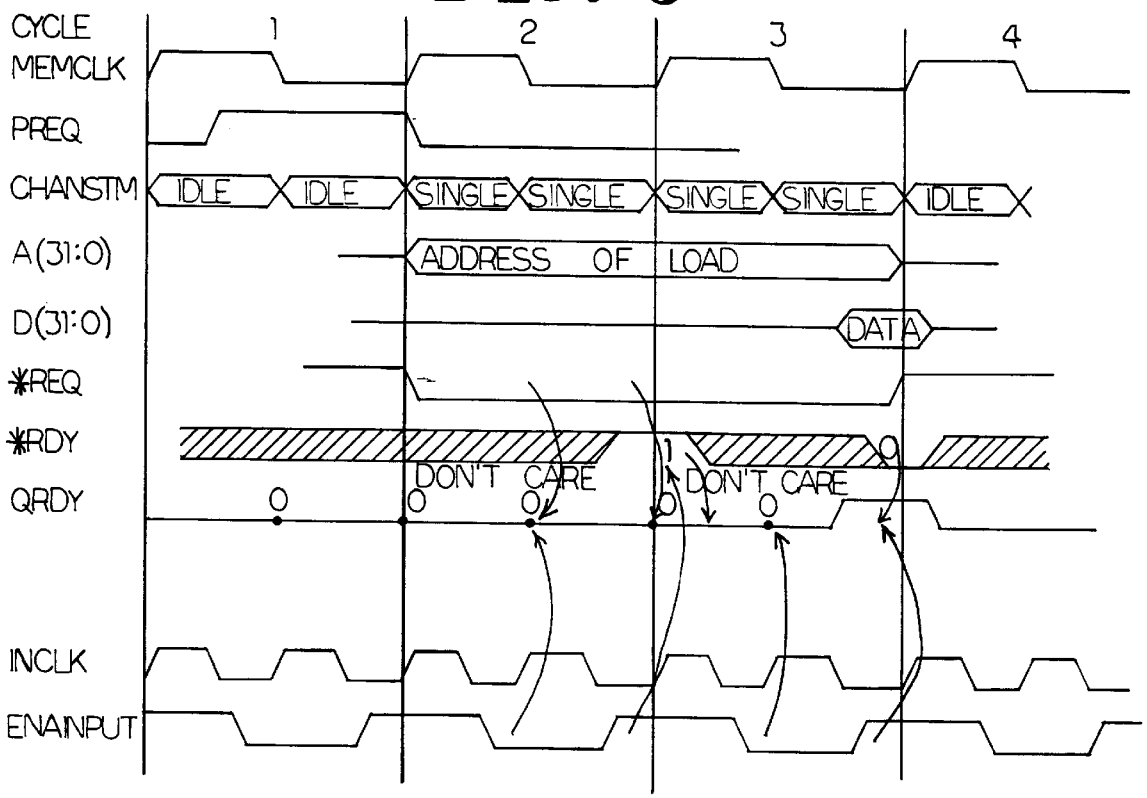
FIG. 7 is a series of waveforms illustrating the operation of the microprocessor of FIG. 2 in performing a synchronized external access to an external memory operating at a frequency which is one-half of the operating frequency of the microprocessor in accordance with the present invention.

Referring now to FIG. 7, it illustrates a series of waveforms which depict the operation of the microprocessor in accordance with the present invention when the microprocessor is operating in the 0.5X mode and hence, is accessing an external memory which is operating at a frequency which is one-half of the microprocessor operating frequency. Here it will be noted that the external clock pulses (INCLK) are at a frequency which is twice the frequency of the memory clock pulses and hence, the microprocessor is at a frequency which is twice the memory clock pulses. During the entire first cycle of the memory clock, the channel state machine is in the idle state. At the beginning of the second memory clock cycle, in view of the pending request within the microprocessor and with the enable input being asserted, the channel state machine transitions to the single state to cause the external memory address to be driven out onto the external address bus and to cause the request signal to be asserted. In the second half of the second memory clock cycle, the channel state machine remains in the single state because the qualified ready signal has not yet been generated by the channel drive 290 of the bus interface unit controller. The channel state machine remains in the single state until the end of the third memory clock cycle wherein it is seen that the external memory has provided the data and has asserted the ready signal. The assertion of the ready signal together with the enable input control signal causes the channel state machine to transition from the single state to the idle state at the beginning of the fourth memory clock cycle to complete the external access.

As can thus be seen from the waveforms of FIGS. 6 and 7, the present invention provides a microprocessor which is capable of synchronously accessing an external memory whether the external memory is operating at the same frequency as the microprocessor or whether the external memory is operating at a frequency which is one-half of the microprocessor operating frequency. Furthermore, the decision making process as to which memory clock edge to drive outputs off of or to enable the receipt of inputs from is conducted independently of the microprocessor bus interface unit controller state machine and output buffers so that such decision making processes are conducted in a manner which is transparent to the external memory and the major logic portions of the microprocessor.

While a particular embodiment of the present invention has been shown and described, modifications may be made, and it is therefore intended to cover in the appended claims all such changes and modifications which fall within the true spirit and scope of the invention.

What is claimed is:

1. A computing system for accessing an external memory operating at a lower clock rate than a microprocessor, the computing system comprising:

a clock circuit producing clock pulses at an external memory accessing rate and at a processing clock rate, an external memory coupled to the clock circuit, operating at the external memory accessing rate associated with the lower clock rate; and an integrated microprocessor coupled to the external memory and the clock circuit, operating at the processing clock rate, the integrated microprocessor being coupled to the external memory for synchronously and directly loading data from and storing data in the external memory, whereby the integrated microprocessor continues to operate at the processing clock rate while the external memory is accessed at the memory accessing rate.

2. The computing system of claim 1 wherein said external memory is coupled to a memory clock portion of said clock circuit for generating memory clock pulses at a first frequency for controlling said external memory accessing rate.

3. The computing system of claim 2 wherein said microprocessor is coupled to a processor clock portion of said clock circuit for generating processor clock pulses at a second frequency for controlling said processing clock rate.

4. The computing system of claim 1 wherein said microprocessor can operate either in a first mode wherein said external memory accessing rate is in a first relationship to said processing clock rate and wherein said microprocessor can operate in a second mode wherein said external memory accessing rate is in a second relationship to said processing clock rate.

5. The computing system of claim 4 wherein said microprocessor includes rate control inputs for controlling whether said microprocessor operates in said first mode or operates in said second mode.

6. The computing system of claim 5 wherein said processing clock rate is twice as high as said external memory accessing means when said microprocessor is operating in said second mode.

7. The computing system of claim 5 wherein said processing clock rate is three times as high as said external memory accessing means when said microprocessor is operating in said second mode.

8. The computing system of claim 1 wherein said processing clock rate is greater than the accessing rate of the external memory by at least 50 percent.

9. The computing system of claim 8 wherein said processing clock rate is an integer multiple of said external memory accessing rate.

10. The computing system of claim 9 wherein said processing clock rate is twice as high as said external memory accessing rate.

11. The computing system of claim 9 wherein said processing clock rate is three times higher than said external memory accessing rate.

12. The computing system of claim 9 wherein said processing clock rate is four times higher than said external memory accessing rate.

13. An integrated microprocessor arranged to access an external memory for executing load and store operations in synchronism with a memory clock which provides memory clock pulses at a first frequency for controlling the accessing rate of the external memory, said microprocessor comprising:

an internal clock circuit, the internal clock circuit generating clock pulses at a second frequency for controlling a processing rate of said microprocessor, the second frequency being greater than the first frequency;

a central processing unit coupled to the internal clock circuit and operating at the processing rate in response to the clock pulses at the second frequency; and a memory access controller coupled to the memory and receiving the memory clock pulses, the memory access controller directly accessing the memory in synchronism with the memory clock pulses while the central processing unit is operating at the processing rate.

14. The integrated microprocessor as defined in claim 13 wherein the microprocessor includes an input for receiving the memory clock pulses from an external source.

15. The integrated microprocessor as defined in claim 13 wherein the microprocessor includes a clock generator for providing the memory clock pulses and an output for providing the memory clock pulses to the memory.

16. The integrated microprocessor as defined in claim 13 wherein a rate control signal indicates that the first frequency is related to the second frequency by a predetermined multiple of two.

17. The integrated microprocessor as defined in claim 16 wherein the rate control signal is a logical level one or a logical level zero.

18. The integrated microprocessor as defined in claim 16 wherein the memory clock pulses include a first phase portion and a second phase portion, wherein the memory is arranged to receive inputs from the microprocessor during the first phase portion and to provide outputs to the microprocessor during the second phase portion, and wherein the memory access controller includes enable means for enabling the microprocessor to provide outputs to the memory during the first phase portion and for enabling the microprocessor to receive inputs from the memory during said second phase portion.

19. The integrated microprocessor as defined in claim 18 wherein the internal clock circuit is arranged for generating first and second processor clock pulses, the first and second processor clock pulses being at the second frequency, having first and second clock pulse phases, and being of opposite phase relation, wherein the enable means is responsive to the rate control signal for enabling the microprocessor to provide the outputs to the memory upon the coincidence of each the first clock pulse first phase and the memory clock pulse first phase portion and to receive inputs from the external memory upon the coincidence of each the second clock pulse first phase and the memory clock pulse second phase portion.

20. The integrated microprocessor as defined in claim 19 wherein the enable means is further responsive to said rate control signal for enabling the microprocessor to provide said outputs to said external memory upon the coincidence of every other the first clock pulse first phase and the memory clock pulse first phase portion and to receive inputs from the memory upon the coincidence of every other the second clock pulse first phase and the memory clock pulse second phase portion.

21. The integrated microprocessor as defined in claim 20 wherein the enable means includes means for generating a first control signal for enabling said microprocessor to provide said outputs to said external memory and a second control signal for enabling said microprocessor to receive said inputs from said external memory.

22. The integrated microprocessor as defined in claim 18 wherein the enable means is responsive to the memory clock pulses, the rate control signal, and the first and second processor clock pulses for generating the first and second control signals.

23. The integrated microprocessor as defined in claim 22 wherein the outputs provided to the memory by the microprocessor include microprocessor access control signals, memory addresses, and data and wherein the inputs received by the microprocessor include memory access control signals and data.

24. The integrated microprocessor as defined in claim 23 wherein the microprocessor is arranged to be coupled to the memory by a plurality control lines, a data bus, and an address bus, wherein the microprocessor includes a plurality of output ports for providing the outputs onto the control lines, the data bus, and the address bus, and wherein the output ports include an output buffer arranged to be enabled by the first control signal for providing the outputs to the memory in synchronism with the memory clock pulses.

25. The integrated microprocessor as defined in claim 24 wherein the output buffers include a hard drive means for initially providing the outputs responsive to the first control signal and weak drive means for maintaining the outputs after termination of the first control signal.

26. The integrated microprocessor as defined in claim 25 wherein the output buffers include an input for receiving the levels of the outputs to be provided to the memory, wherein the microprocessor is arranged to provide the output levels to the output buffer inputs before the first control signal and wherein the output buffers include a latch coupled to the inputs for temporarily holding the levels at the inputs.

27. The integrated microprocessor as defined in claim 26 wherein the buffers include isolation means for isolating the inputs from the latches responsive to the first control signal to permit the levels at the inputs to be updated as the previous levels are provided to the memory.

28. The integrated microprocessor as defined in claim 27 wherein the output buffers are arranged to transfer the previous levels from the hard drive means to the weak drive means responsive to the termination of said first control signal prior to the input latches holding said updated output levels.

29. The integrated microprocessor as defined in claim 28 wherein the output buffers include a second latch for holding the transferred output levels and second isolation means for isolating the second latches from the updated levels responsive to the termination of the first control signal.

30. The integrated microprocessor as defined in claim 22 wherein the memory access controller includes at least one input for receiving an access control signal from the memory, the input including logic means responsive to the second control signal, the second phase portion of the memory clock pulses, and the first phase of the second processor clock pulses for receiving the external access control signal from the memory.

31. The integrated microprocessor as defined in claim 30 wherein the access control signal from the memory is a ready signal indicating successful completion of an access, and wherein the microprocessor is responsive to the ready signal for terminating the completed access.

32. The integrated microprocessor as defined in claim 31 wherein the memory access controller includes a state machine having at least first and second states, the second state for initiating and continuing an access to completion and the first state for terminating the completed access.

33. The integrated microprocessor as defined in claim 32 wherein the central processing unit provides an access request signal, wherein the memory access controller includes latch means for generating a pending request signal responsive to the access request signal, and wherein the state machine is responsive to the pending request signal, the second control signal, and being in the first state for sequencing to the second state upon the next first phase of the second processor clock pulses for initiating the access.

34. The integrated microprocessor as defined in claim 33 wherein the state machine is arranged for clearing the pending request signal from the latch means upon initiating the access.

35. The integrated microprocessor as defined in claim 34 wherein the memory access controller further includes ready means coupled to the logic means and being responsive to the ready signal for providing a qualified ready signal.

36. The integrated microprocessor as defined in claim 35 wherein the state machine is responsive to the qualified reading signal, the absence of the pending request signal, and being in the second state for sequencing to the first state upon the next first phase of the second processor clock pulses for terminating the completed external access.

37. In a computer system including a memory, a microprocessor, and a clock circuit, the memory coupled to the microprocessor by an address bus for executing load and store operations in synchronism with memory clock pulses at a first frequency, the memory clock pulses being provided to the microprocessor and the memory for controlling an accessing rate of the memory over the address bus, the clock circuit generating processor clock pulses at a second frequency for controlling a processing rate of the microprocessor, the second frequency being greater than the first frequency, the microprocessor comprising:

a central processing unit coupled to the clock circuit, the central processing unit receiving the processor clock pulses and operating at the processing rate; and a bus interface unit coupled to the central processing unit and the address bus, the bus interface unit controlling when memory addresses are to be conveyed to the external memory over the bus to enable accessing of the memory, the bus interface unit being responsive to the memory clock pulses and the processor clock pulses for causing the memory address to be placed on the bus at the accessing rate while the central processing unit operates at the processing rate.

38. The microprocessor as defined in claim 37 wherein the memory is an external memory.

39. The microprocessor as defined in claim 37 wherein the bus interface unit is coupled to the memory by a plurality of control lines and wherein a control means is arranged to cause the bus interface unit to provide the memory with first access control signals over selected ones of control lines when the memory clock pulses and the processor clock pulses are in a first predetermined phase relation to each other.

40. The microprocessor as defined in claim 39 wherein the bus interface unit is arranged for receiving second access control signals from the memory over selected ones of the control lines and wherein the control means is arranged to enable the bus interface unit to receive the second access control signals from the memory when the memory clock pulses and the processor clock pulses are in a second predetermined phase relation to each other.

41. The microprocessor as defined in claim 40 wherein the second frequency is predetermined multiple of the first frequency.

42. The microprocessor as defined in claim 41 wherein the memory clock pulses include a first phase portion and a second phase portion wherein the memory is arranged to receive the memory addresses and the first access control signals from the microprocessor during the first phase portion and to provide the second access control signals to the microprocessor during the second phase portion, and wherein the control means includes enable means for enabling the microprocessor to provide the addresses and first control signals to the memory during the first phase portion and for enabling the microprocessor to receive the second control signals from the memory during the second phase portion.

43. The microprocessor as defined in claim 42 wherein clock circuit is arranged for generating the clock pulses as first and second processor clock pulses, the first and second processor clock pulses being at the second frequency and having first and second clock pulse phases being of opposite phase relation, wherein the enable means is responsive to a rate control signal for enabling the microprocessor to provide the addresses and first control signals to the external memory upon the coincidence of each first clock pulse first phase and the memory clock pulse first phase portion and to receive the second control signals from the external memory upon the coincidence of each second clock pulse first phase and the memory clock pulse second phase portion.

44. The microprocessor as defined in claim 43 wherein the enable means is further responsive to the rate control signal for enabling the microprocessor to provide the addresses and first control signals to the external memory upon the coincidence of every other first clock pulse first phase and the memory clock pulse first phase portion and to receive the second control signals from the external memory upon the coincidence of every other second clock pulse first phase and the memory clock pulse second phase portion.

45. The microprocessor as defined in claim 44 when the enable means includes means for generating a drive output control signal for enabling the microprocessor to provide the addresses and first control signals to the memory and an enable input control signal for enabling the microprocessor to receive the second control signals from the memory.

46. A method of accessing data in a computer system, the computer system including a memory, a microprocessor, a clock circuit and a memory clock, the memory is coupled to the microprocessor by an external address bus and stores the data, the memory and the microprocessor are coupled to the memory clock, the method comprising steps of:

providing processor clock pulses from the clock circuit to the microprocessor;

providing memory clock pulses from the memory clock to the memory and the microprocessor, the memory clock pulses being at a first frequency, and the processor clock pulses being at a second frequency, the second frequency being greater than the first frequency;

executing load and store instructions in the microprocessor in response to the microprocessor clock pulses; and accessing the memory with the microprocessor to obtain the data in response to the load and store instructions in synchronism with the memory clock pulses while the microprocessor operates at the second frequency.

47. The method of claim 46 wherein the computer system further includes a rate control input coupled to the microprocessor.

48. The method of claim 47 further comprising;

receiving a rate control signal at the rate control input, the rate control signal being indicative of the relationship between the first frequency and the second frequency.

49. The method of claim 46 further comprising a step of: placing memory address on an address bus when the memory clock pulses and the processor clock pulses are in a first predetermined phase relationship to each other.

50. The method of claim 49 further comprising a step of: receiving control signals from the memory when the memory clock pulses and the processor clock pulses are in a second predetermined phase relationship to each other.

51. The method of claim 50 wherein the second frequency is a predetermined multiple of the first frequency.

52. The method of claim 51 wherein the first frequency differs from the second frequency by a multiple of two.

53. A method of operating a computer system, the computer system including an external memory, a microprocessor and a clock circuit, the external memory being coupled to the microprocessor by an external bus, the external memory and the microprocessor being coupled to the clock circuit, the clock circuit providing memory clock pulses and processor clock pulses, the microprocessor including a rate control input, the method comprising steps of:

receiving a rate control signal at the rate control input of the microprocessor;

receiving memory clock pulses from the clock circuit at the microprocessor; and synchronously and directly accessing data in the external memory with the microprocessor in response to the processor clock pulses and the memory clock pulses, whereby the microprocessor accesses the external memory in response to the memory clock pulses in accordance with the rate control signal while the microprocessor continues to operate in response to the processor clock pulses.

54. The method of claim 53 wherein the rate control signal is a bi-level signal capable of indicating that the microprocessor clock pulses are at twice the frequency of the memory clock pulses.

55. The method of claim 53 wherein the accessing step is performed by providing data to the external memory when the memory clock pulses and the processor clock pulses are in a first predetermined phase relationship to each other.

56. The method of claim 53 wherein the external memory is a cache memory.

57. The method of claim 53 wherein the external memory is a dynamic random access memory.

58. An output buffer for use in a microprocessor capable of operating at a processing rate for driving outputs to an external memory operating at an accessing rate over an external bus, the processing rate being greater than the accessing rate, the microprocessor operating at the processing rate while accessing the external memory at the accessing rate, said output buffer comprising:

an input for receiving an input signal level;

an output for driving said external bus with said levels of said input signals;

a control input for receiving a control signal, said control input being coupled to said output for causing said output to drive said external bus with said level of said input signal responsive to said control signal; and isolating means coupled between said input and said output, and being coupled to said control input for isolating said input from said output in response to said control signal to enable said input to be updated with a new input signal level while said external bus is being driven with said input signal level.

59. An output buffer as defined in claim 58 wherein said output includes a hard drive means for initially driving said bus with said level of said input signal responsive to said control signal and weak drive means for driving said bus with said level or said input signal after termination of said control signal.

60. An output buffer as defined in claim 59 wherein said output buffer further includes a first latch coupled between said isolation means and said output for temporarily holding said input level.

61. An output buffer as defined in claim 60 wherein said output buffer is arranged to transfer said input signal level from said hard drive means to said weak drive means responsive to the termination of said control signal.

62. An output buffer as defined in claim 61 wherein said output buffer includes a second latch for holding said transferred input level and second isolation means for isolating said second latch from said updated input level responsive to the termination of said control signal.

63. An output buffer for use in a microprocessor for driving outputs to an external memory over an external bus, the microprocessor capable of operating at a processing rate and the external memory operating at an accessing rate, the processing rate being greater than the accessing rate, the microprocessor operating at the processing rate while accessing the external memory at the accessing rate, the output buffer comprising:

an input coupled to receive an input signal, the input signal having a current signal level and a previous signal level;

a buffer output coupleable to the external bus;

a control input coupled to the buffer output, the control input receiving a control signal;

a first drive circuit including a first drive output coupled to the buffer output, the first drive circuit generating the current signal level at the first drive output to cause the buffer output to drive the external bus with the current signal level when the control signal is in a first state;

a second drive circuit including a second drive output coupled to the buffer output, the second drive circuit generating the previous signal level at the second drive output to cause the buffer output to drive the external bus with the previous signal level when the control signal is in a second state; and an isolation circuit coupled between the input and the buffer output, and coupled to the control input, the isolation circuit isolating the input from the buffer output when the control signal is in a second state to enable the buffer output to drive the external bus at the previous input signal level without respect to the current input signal level.

64. The output buffer as defined in claim 63 wherein the first drive circuit is configured to drive greater currents than the second drive circuit.

65. The output buffer of claim 64 wherein the output buffer further includes a first latch coupled between the isolation circuit and the buffer output, the first latch temporarily holding the current signal level.

66. The output buffer of claim 65 wherein the output buffer is arranged to transfer the current signal level from the first driving circuit to the second driving circuit when the control signal is in the first state.

67. The output buffer as defined in claim 66 wherein the output buffer includes a second latch for holding the current signal level after the current signal level is transferred from the first drive circuit and a second isolation circuit for isolating the second latch from the first latch when the control signal is in the second state.

68. A computing system for accessing an external memory operating at a slower clock rate than a microprocessor, the computing system comprising:

a clock circuit producing clock pulses at an external memory accessing rate and at a processing clock rate, an integrated microprocessor coupled to the external memory and the clock circuit, operating at the processing clock rate, the integrated microprocessor being coupled to the external memory for synchronously loading data from and storing data in the external memory, whereby the integrated microprocessor continues to operate at the processing clock rate while the external memory is accessed at the memory accessing rate.

69. The computing system of claim 68 wherein said processing clock rate is greater than said external memory accessing rate.

70. The computing system of claim 69 wherein said processing clock rate is an integer multiple of said external memory accessing rate.

71. The computing system of claim 70 wherein said processing clock rate is twice as high as said external memory accessing rate.

72. The computing system of claim 70 wherein said processing clock is three times higher than said external memory accessing rate.

73. The computing system of claim 70 wherein said processing clock rate is four times higher than said external memory accessing rate.

74. An integrated microprocessor arranged to access an external memory for executing load and store operations in synchronism with a memory clock which provides memory clock pulses at a first frequency for controlling the accessing rate of the external memory, said microprocessor comprising:

an internal clock circuit, the internal clock circuit generating clock pulses at a second frequency for controlling a processing rate of said microprocessor, the second frequency being greater than the first frequency; and a central processing unit coupled to the internal clock and operating at the processing rate in response to the clock pulses at the second frequency;

a memory access controller coupled to the memory and receiving the memory clock pulses, the memory access controller accessing the memory in synchronism with the memory clock pulses while the central processing unit is operating at the processing rate.

75. The integrated microprocessor as defined in claim 74 wherein a rate control signal indicates that the first frequency is related to the second frequency by a predetermined multiple of two.

76. The integrated microprocessor as defined in claim 75 wherein the rate control signal is a logical level one or a logical level zero.

77. The integrated microprocessor as defined in claim 74 wherein the memory clock pulses include a first phase portion and a second phase portion, wherein the memory is arranged to receive inputs from the microprocessor during the first phase portion and to provide outputs to the microprocessor during the second phase portion, and wherein the memory access controller includes enable means for enabling the microprocessor to provide outputs to the memory during the first phase portion and for enabling the microprocessor to receive inputs from the memory during said second phase portion.

* * * * *